Jan. 2, 1951         L. H. HUGHES         2,536,550
JACK CONVERTER ATTACHMENT
Filed May 2, 1949         2 Sheets-Sheet 1
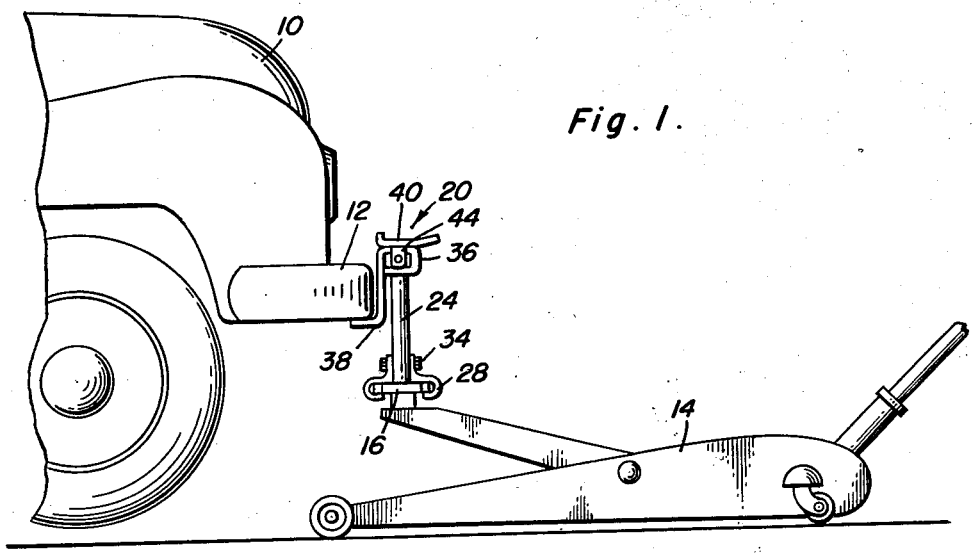
Fig. 1.
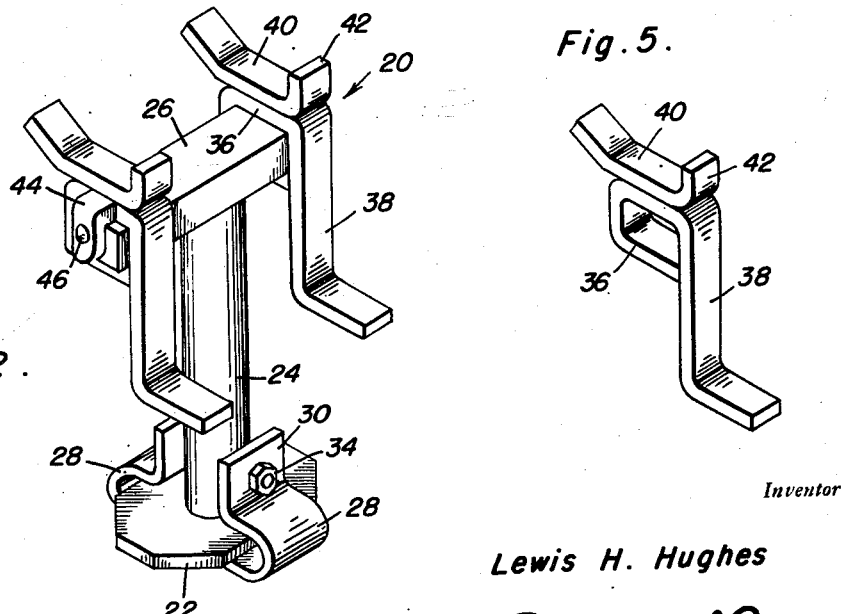
Fig. 2.
Fig. 5.
Inventor
Lewis H. Hughes
By *Clarence A. O'Brien and Harvey B. Jacobson*
Attorneys Jan. 2, 1951  L. H. HUGHES  2,536,550
JACK CONVERTER ATTACHMENT
Filed May 2, 1949  2 Sheets-Sheet 2

Inventor
Lewis H. Hughes
By Clarence A. O'Brien
and Harvey B. Jacobson
Attorneys Patented Jan. 2, 1951

2,536,550

UNITED STATES PATENT OFFICE 2,536,550

JACK CONVERTER ATTACHMENT

Lewis H. Hughes, Kingston, Pa.

Application May 2, 1949, Serial No. 90,840

4 Claims. (Cl. 254—133)

This invention relates to an attachment the primary object of which is to convert the conventional roller type floor jack to bumper jacks.

The standard roller type floor jack is placed under the axle or housing of an automobile and lifts the body and wheels off the floor. Because of the new fender designs, the wheels must drop if they are to be serviced. The principal purpose of the instant invention is to convert this standard jack to a bumper jack for use especially with those automobiles including the new fender designs.

Another important object of the invention is to provide an attachment of the character described which includes bumper engaging brackets that may be selectively employed with higher and lower type bumpers.

A further object of the invention is to provide an attachment for converting a floor jack to a bumper jack comprising a base plate received in the saddle of the floor jack, means for clamping said base plate to the saddle, a center post carried by said base plate, a crossbar carried by said center post, and bracket means carried by said crossbar adapted to selectively engage bumpers of varying heights.

These, together with various ancillary objects and features of the invention which will later become apparent as the following description proceeds, are attained by the device, a preferred embodiment of which has been illustrated by way of example only in the accompanying drawings, wherein:

Figure 1 is a side elevation of the device;

Figure 2 is a perspective view of the device shown detached from the standard jack;

Figure 5 is a perspective view of one of the bumper brackets; and

Specific reference is now made to the drawings. In the several views in the accompanying drawings and in the following specification similar reference characters indicate corresponding elements throughout.

Figure 3:
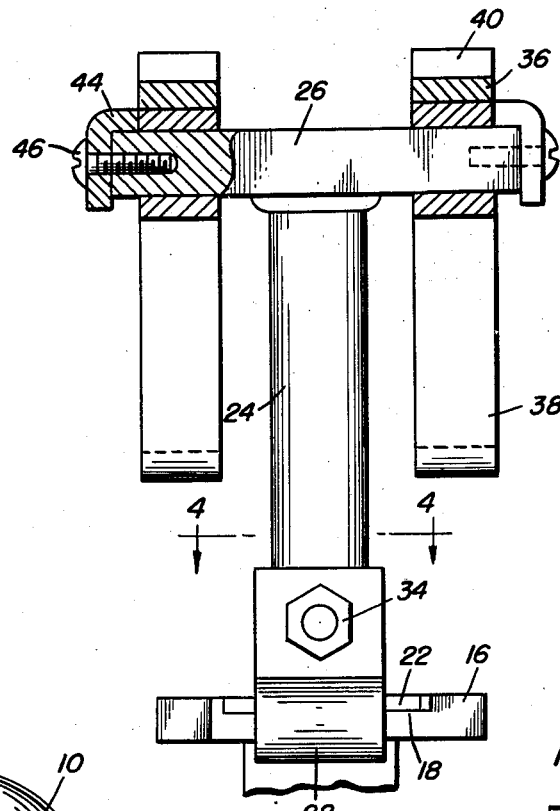
Figure 3 is a vertical sectional view through the device.
Figure 4:
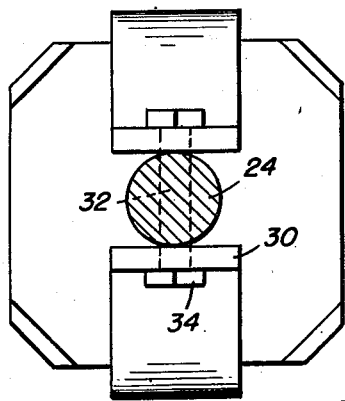
Figure 4 is a sectional view taken on the line 4—4 of Figure 3.

Indicated generally at 10 is an automotive vehicle having a rear bumper 12. A conventional roller-type jack 14 is shown having the usual saddle 16 which is recessed as at 18. It is this saddle which normally engages the axle or housing of an automotive vehicle. The attachment of the instant invention is shown at 20 and is designed to convert the jack 14 to a bumper engaging jack.

The attachment consists of a base plate 22, suitably configurated to fit into the recess 18 of the saddle 16. Welded centrally to the base plate is a center post 24 preferably cylindrical in shape, to which is secured a transversely extending crossbar 26, preferably rectangular in shape.

The attachment is secured to the saddle 16 by means of a pair of C-clamps 28 embracing the base plate 22 and saddle 16, the clamps having vertical apertured lugs 30 for receiving a headed bolt 32 which extends through the center post and receives a nut 34 for securing the clamps to the center post.

Figure 6:
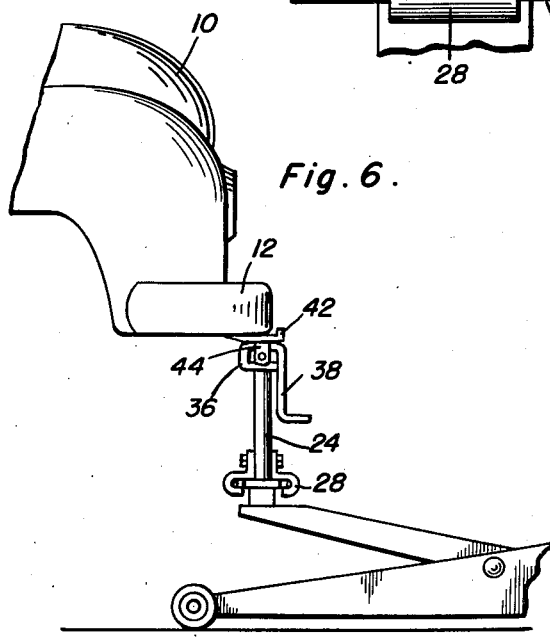
Figure 6 is a side elevation similar to Figure 1 showing the use of the device with a higher bumper.

Engaging the crossbar 26 is a pair of collars 36 also substantially rectangular in shape. Integral with one side of each of the collars is an L-shaped bar 38 which is adapted to receive a lower bumper as shown in Figure 1. Also secured to the tops of the collars are transversely extending angulated lugs 40 having vertical lips 42, these lugs being adapted to receive a higher bumper as shown clearly in Figure 6. While the collars can be carried on the crossbar as such, it is preferable that they be further provided with L-shaped bars 44 adapted to embrace the edges of the crossbar and to receive screws 46 extending into the crossbar for additional security.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An attachment for converting a floor jack to a bumper jack comprising a base plate received in the saddle of the floor jack, means for clamping said base plate to the saddle, a center post carried by said base plate, a crossbar carried by said center post, and bracket means carried by said crossbar adapted to engage bumpers, said clamping means including a pair of opposed straps straddling said base plate and saddle and a bolt extending through said straps and said center post.

2. An attachment for converting a floor jack to a bumper jack comprising a base plate received in the saddle of the floor jack, means for clamping said base plate to the saddle, a center post, and bracket means carried by said crossbar adapted to engage bumpers, said bracket means including collars received on said crossbar and means carried by said collars for engaging bumpers.

3. The combination of claim 2 wherein said last-named means includes L-shaped lugs secured to the sides of said collars for engaging lower bumpers.

4. The combination of claim 2 wherein said last-named means includes dish-shaped lugs secured to the tops of said collars for engaging higher bumpers.

LEWIS H. HUGHES.

REFERENCES CITED

The following references are of record in the file of this patent:

UNITED STATES PATENTS

| Number | Name | Date |
|---|---|---|
| 87,435 | Ryan | Mar. 2, 1869 |
| 1,692,345 | Morrison | Nov. 20, 1928 |